Jan. 18, 1966       F. J. CARSON ETAL       3,230,066
APPARATUS FOR BENDING GLASS SHEETS
Original Filed Nov. 1, 1960                3 Sheets-Sheet 1

INVENTORS
Frank J. Carson and
Herbert A. Leflet, Jr.

Jan. 18, 1966     F. J. CARSON ETAL     3,230,066
APPARATUS FOR BENDING GLASS SHEETS
Original Filed Nov. 1, 1960     3 Sheets-Sheet 3

INVENTORS
Frank J. Carson and
Herbert A. Leflet, Jr.

United States Patent Office 3,230,066
Patented Jan. 18, 1966

3,230,066
APPARATUS FOR BENDING GLASS SHEETS
Frank J. Carson and Herbert A. Leflet, Jr., Toledo, Ohio, assignors to Libbey-Owens-Ford Glass Company, Toledo, Ohio, a corporation of Ohio
Original application Nov. 1, 1960, Ser. No. 66,630. Divided and this application July 5, 1962, Ser. No. 215,758
6 Claims. (Cl. 65—287)

This application is a division of application Serial No. 66,630, filed November 1, 1960, and now abandoned.

This invention relates broadly to the bending of glass sheets or plates and, more particularly, relates to a novel glass bending apparatus or mold for producing a vehicle glazing closure of relatively complex curvature.

The bending of automotive glass has heretofore been accomplished by supporting a glass sheet on a bending mold and thereafter passing the mold through a heating furnace until the sheet softens and settles into conformity with the generally concave shaping surface of the mold. Ordinarily, the mold shaping surface includes a central area of relatively shallow curvature that may or may not terminate in more sharply curved end areas. Whether the resulting bent glass sheet is ultimately employed to glaze the opening in the front or rear of the automobile, the curvature attained is one of a generally convex nature, both horizontally and vertically, when installed in the automobile, since it is highly desirable that the glass sheet blend smoothly into the contoured shaping of the cowl at the front of the car or the trunk lid at the rear thereof as well as the convex curvature of the roof of the car.

This compliance in the bending of glass sheets to meet the present-day styling of many popular automobiles may not, however, be entirely satisfactory to the design and styling of future automotive bodies in which the longitudinal silhouette thereof may be substantially modified. Thus, a variation or modification in the styling of present-day automobiles may require glazing closures to conform to known transverse convex curvatures in one plane of the body while including a different curvature, such as of a concave nature, in the second plane or the longitudinal vertical silhouette of the automobile body.

It is, therefore, the principal object of the present invention to provide a novel bending apparatus or mold adapted for bending a glass sheet substantially simultaneously about both of its axes to predetermined curvatures.

More particularly, it is a further object of the invention to provide a bending mold adapted for bending a glass sheet generally concavely about a first axis thereof and generally convexly about a second axis of the sheet.

Other objects and advantages of the invention will become more apparent during the course of the following description when taken in connection with the accompanying drawings.

In the drawings wherein like numerals are employed to designate like parts throughout the same:

FIG. 6 is a vertical longitudinal sectional view taken along the line 6—6 of FIG. 4.

Figure 1:
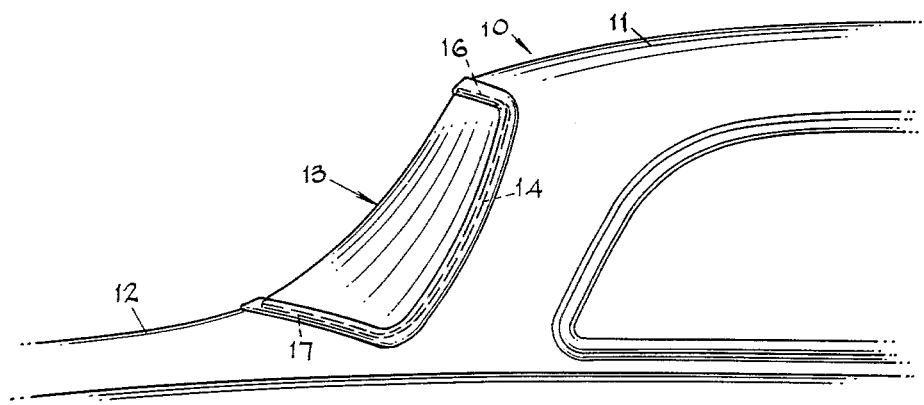
FIG. 1 is a side elevational view of an automobile rear window glass bent on a mold in accordance with the invention and shown in its installed position.
Figure 2:
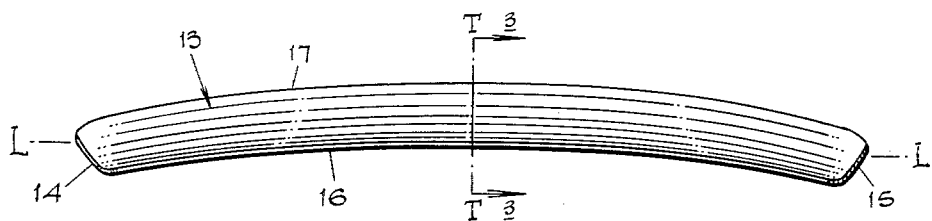
FIG. 2 is a view of the window glass sheet as viewed from the top edge.
Figure 3:
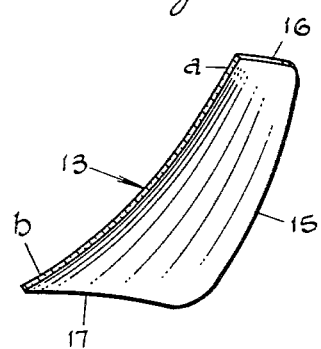
FIG. 3 is a vertical sectional view taken along the line 3—3 of FIG. 2.

Referring now to the drawings, and more particularly to FIGS. 1 to 3, the numeral 10 indicates generally a portion of an automobile body having roof and trunk panel contours to which a glazing closure produced on the mold in accordance with the invention is adapted to conform. In this respect, and in order to more clearly set forth the utility and structural features of the novel mold in accordance with the invention, the same will be described in connection with the production of a glazing closure for use as an automobile rear window or backlight, it being understood however that such description is for the purpose of illustration only and is not to be considered as limiting the invention in any manner. Thus, the roof 11 of the automobile body 10 illustrated is of a generally shallow, convex transverse curvature, such curvature being maintained in the downwardly sloping rear surface of the body in which the opening for the rear window is provided. In addition, the trunk panel or lid 12 is of generally concave curvature in the longitudinal silhouette of the automobile and it is desired to maintain this curvature in the aforementioned downwardly sloping rear surface of the body.

The numeral 13 indicates generally the glass sheet forming the glazing closure or, in the parcticular embodiment illustrated, the backlight produced on the mold in accordance with the invention and conforming to the above-described curvatures. As best shown in FIGS. 2 and 3, the glass sheet 13 is gently curved or bent generally convexly about its transverse axis T—T between the longitudinal extremities or ends 14 and 15 thereof, and additionally is bent concavely about its longitudinal axis indicated generally by the line L—L, between the top and bottom edges 16 and 17, respectively, of the sheet. In other words, the sheet is bent to an anticlastic configuration. In the embodiment illustrated in the drawings, the radius of transverse curvature of the sheet 13 about the longitudinal axis L—L is relatively greater at the upper portion thereof $a$ than at the lower portion $b$. However, both curves about the longitudinal axis are relatively gentle.

As shown in FIG. 1, in the installed position of the glass sheet 13, the top portion thereof adjacent and including the top edge 16 conforms not only to the aforementioned downwardly sloping curvature of the rear surface of the body but also to the upper edge of the outline of the window opening therein. Similarly, the lower edge 17 of the glass sheet 13 is in agreement with the lower edge of the outline of the window opening where the gradual transition of curvature from the downwardly sloping rear surface merges and blends into the shaping of the trunk lid or panel 12. Contrary, however, to the outwardly directed or convexly shaped surface or silhouette of the automobile body, the glass sheet 13 is concavely bent to present a distinctly curved surface blending from the car roof 11 into the trunk panel 12.

Referring now to FIGS. 4 through 7 of the drawings, there is shown the bending apparatus in accordance with the invention which is designated in its entirety by the numeral 20 and comprises a rigid framework or support rack 21 on which is carried a skeleton, outline or peripheral ring-type mold indicated generally at 22. The rack 21 includes a pair of end frames 23 and a pair of longitudinally disposed side rails 24 extending between and secured at their respective ends in the end frames 23.

The peripheral ring mold 22 is formed by inner and outer continuous rails indicated generally at 25 and 26, respectively, which are interjoined by means of regularly spaced web members 27. The inner rail 25, in plan, essentially conforms to the outline of the bent glass sheet 13 and defines the actual curvature of the bending mold to which the sheet is bent. The rail 25 is formed of oppositely disposed and substantially parallel extending side members or sections 28 and 29 which continue through suitably rounded corner portions 30 and 31 into the end members or sections 32 and 33. The end members 32 and 33 diverge outwardly in plan with respect to each other from the corner portions 31 to the opposed corner portions 30. In addition, the end members are upwardly and outwardly skewed with respect to each other along the transverse axis of the mold, such skewness continuing into the corner portions and finally disappearing by the blending or merging of the corner portions 30 and 31 into the side members 28 and 29.

The upper edges of the several sections of the rail 25 are reduced in thickness and are suitably finished to provide a preferably continuous shaping surface 34 on which a flat glass sheet 13a is adapted to be bent. The mold 22 is fixedly supported on the rack 21 by transversely extending, horizontally disposed rods 35 secured to the bottom edges of the rails 25 and 26 and fixed at their opposite ends in the side rails 24 of the support rack.

The particular curvatures to which the glass sheet 13a is to be bent on the shaping surface 34 of the mold 22 are dependent upon the arcuate shaping of the side sections or members 28 and 29 in both the horizontal and vertical planes, which define the amount of bend about the transverse axis of the sheet, as well as by the arcuate shaping of the end members or sections 32 and 33 in such planes which define the amount of bend about the longitudinal axis of the sheet. In this respect, the side members 28 and 29 are convexly curved with respect to the vertical plane while the end members 32 and 33 are concavely curved, with the corner portions 30 and 31 constituting substantial continuations of the curvature of the side and end members and with the shaping surfaces thereof being inclined downwardly into the shaping surface portions of the end members. In addition, the side members 28 and 29 are correspondingly curved with respect to the horizontal plane, i.e. curved in the same direction and have substantially equal radii of curvature.

Figure 5:
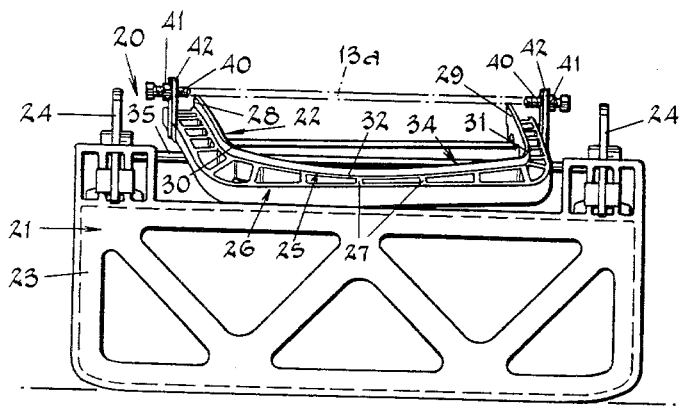
FIG. 5 is an end view in elevation of the bending apparatus.

Accordingly, when the glass sheet 13a is placed on the mold 22, it will initially be supported in its central area on the high or "crown" areas of the side members 28 and 29, as shown in FIGS. 5 and 6, and when softened under the influence of heat, will gradually sag into bent conformity therewith, with the bending action occurring outwardly and equally from the central crown areas of the members. During settling of the sheet into the longitudinally extending convex portions of the shaping surface, it is expected and actually intended that cross-bending or bending of the sheet about its longitudinal axis will occur as the ends of the sheet are received on the end members 32 and 33. In fact, since these portions of the shaping surface contain a predetermined amount of concave curvature, the desired concave bend occurring in the central areas of the sheet while they are simultaneously bent to a convex curvature will be aided or assured when the end portions of the sheet settle onto the said end members and corner portions 32 and 33 and conform thereto. In this manner then, glass sheet 13a will be bent into the novel anticlastic form illustrated in FIGS. 1 to 3 and described above.

Figure 4:
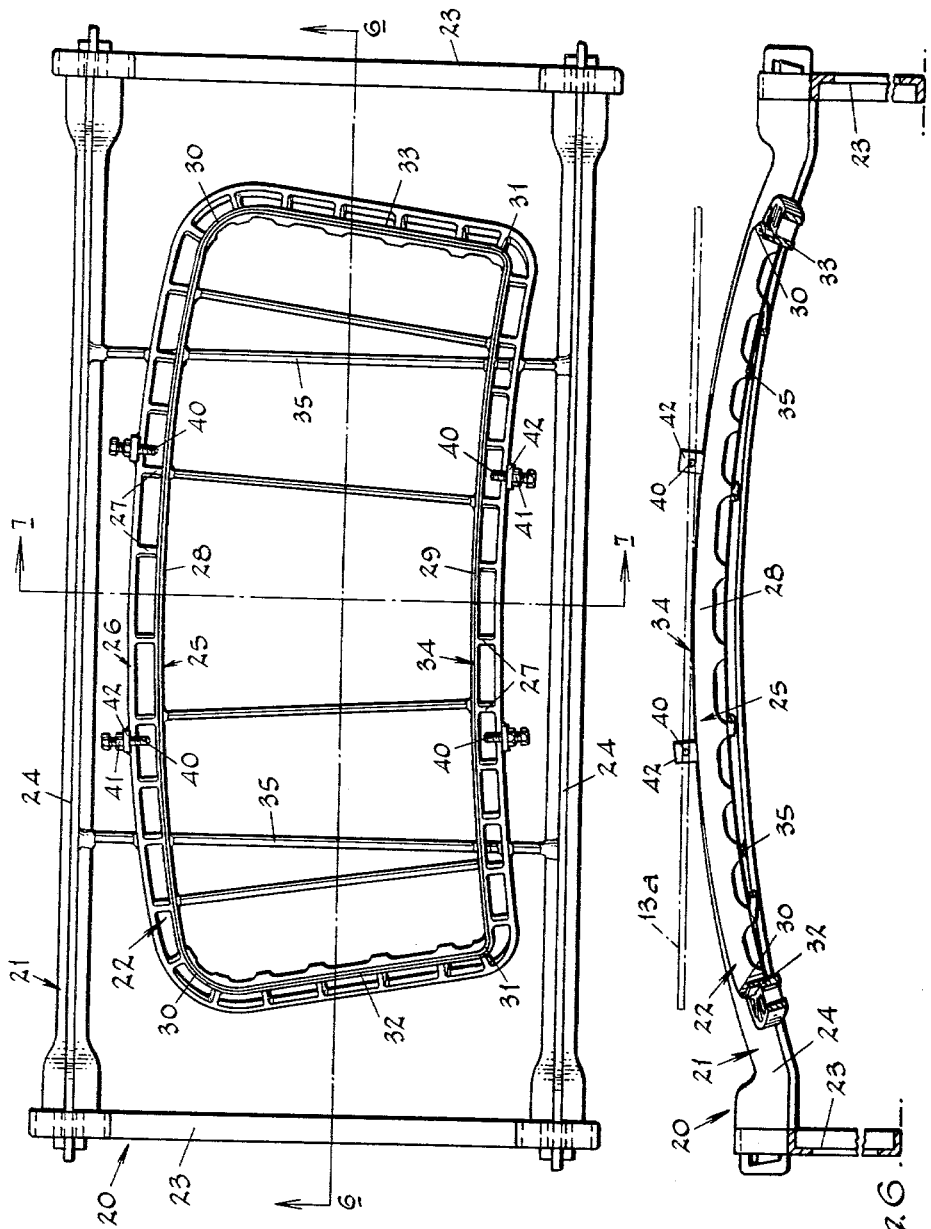
FIG. 4 is a plan view of the bending apparatus in accordance with the invention and on which the glass sheet of FIG. 2 is bent.
Figure 7:
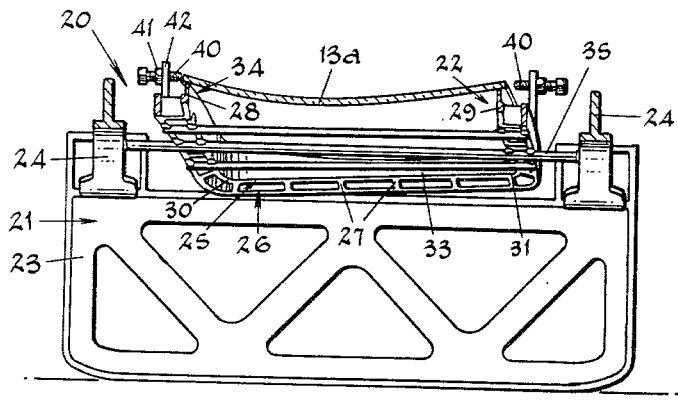
FIG. 7 is a vertical transverse sectional view taken along the line 7—7 of FIG. 4.

In order to position a rigid glass sheet to be sent on the mold 22, means is provided to engage opppositely disposed edge portions thereof along and above the side members or sections 28 and 29. For this purpose, pairs of locator screws 40 provided with lock-nuts 41 are threaded into mounting plates 42 secured at their lower ends to the outer surfaces of the mold rail 26. As illustrated in FIGS. 4 and 5, the pairs of screws 40 on each side of the mold are located in a common horizontal plane coincident with the plane in which a rigid glass sheet is initially supported on the shaping surface 34. Each of the oppositely disposed pairs of locator screws 40 are spaced outwardly from the shaping surface 34 of the mold so that as the glass sheet bends, the engaged edge portions thereof will fall away from the contacting ends of the screws and as a result will not be held thereby during bending of the sheet to a concave curvature as shown in FIG. 7.

It will now be apparent that a unique glass bending mold for producing vehicle and the like glazings is provided by the invention. Further, although only a preferred embodiment has been disclosed, it should be understood that various structural changes can be made therein without departing from the spirit and scope of the invention, as defined in the appended claims.

We claim:

1. An outline type bending mold for bending glass sheets about both major axes thereof, comprising a substantially continuous peripheral shaping rail having a shaping surface adapted to form an anticlastic curvature in a glass sheet bent into conformity therewith, said shaping rail including a pair of opposed, spaced, longitudinally extending side members and a pair of transversely extending end members connecting the adjacent ends of said side members, the shaping surface portions of said side members being convexly curved as viewed in elevation to create corresponding convex curvature in said sheet in the longitudinal dimension throughout the entire length thereof, and the shaping surface portions of said end members being concavely curved as viewed in elevation to create a corresponding concave curvature in the transverse dimension of the sheet throughout the entire length of said sheet.

2. An outline type bending mold for bending glass sheets about both major axes thereof as defined in claim 1, in which said peripheral shaping rail side and end members are connected by curved corner portions having shaping surface portions of such curvature as to merge with the curvature of the shaping surface portions of said side and end members.

3. An outline type bending mold for bending glass sheets about both major axes thereof, comprising a substantially continuous shaping rail having a shaping surface adapted to form an anticlastic curvature in a glass sheet bent into conformity therewith, said shaping rail including a pair of opposed, spaced longitudinally extending side members and a pair of transversely extending end members connected with the ends of said side members, the shaping surface portions of said side members being arcuate in form as projected onto a plane normal to the transverse axis of the shaping rail to impart corresponding curvature to said sheet in the longitudinal dimension through the entire length thereof, and the shaping surface portions of said end members being arcuate in form as projected onto a plane normal to the longitudinal axis of the shaping rail and curving in the direction opposite to said side members to impart a corresponding opposite curvature in the transverse dimension of the sheet throughout the entire length of said sheet.

4. An outline type bending mold for bending glass sheets about both major axes thereof, comprising a substantially continuous peripheral shaping rail having a shaping surface adapted to form an anticlastic curvature in a glass sheet bent into conformity therewith, said shaping rail comprising a pair of opposed, spaced, longitudinally extending side members and a pair of transversely extending end members connecting the adjacent ends of said side members, the shaping surface portion of each of said side member being of convex curvature along its longitudinal axis to follow a dome surface, the shaping surface portion of each of said end members being a concave curvature along its longitudinal axis to follow a dome surface in the direction opposite to said side members and impart a transverse curvature to the sheet throughout the length of said sheet similar to that of the shaping surface portions of said end members.

5. An outline type bending mold for bending glass sheets about both major axes thereof, comprising a substantially continuous peripheral shaping rail having a shaping surface into conformity with which a glass sheet is to be bent, said shaping rail comprising a pair of opposed, spaced, longitudinally extending side members and a pair of transversely extending end members connecting the adjacent ends of said side members, the shaping surface portions of said members being of convex curvature as viewed in elevation to create corresponding convex curvature in the sheet throughout its longitudinal dimension and also transversely from one side edge to the other side edge of said sheet, and the shaping surface portions of said end members being of concave curvature as viewed in elevation to impart a corresponding concave curvature along the transverse dimension of the sheet throughout the entire length of said sheet.

6. An outline type bending mold for bending glass sheets about both major axis thereof, comprising a substantially continuous shaping rail having a shaping surface adapted to form an anticlastic curvature in a glass sheet bent into conformity therewith, said shaping rail including a pair of opposed, spaced, longitudinally extending side members of different lengths and a pair of transversely extending end members shorter than said side members and diverging outwardly from the shorter toward the longer of the side members to connect the adjacent ends of said side members, the shaping surface portions of said side members being of convex curvature as viewed in elevation to create corresponding convex curvature in said sheet in the longitudinal dimension thereof, the shaping surface portions of said end members being of concave curvature as viewed in elevation to create a corresponding concave curvature in the transverse dimension of said sheet and throughout the entire length thereof, said peripheral shaping rail side and end members being connected by curved corner portions having shaping surface portions of such curvature as to merge with the curvature of the shaping surface portions of said side and end members, and glass sheet locating members disposed along each said side member inwardly of the ends thereof for initially positioning the glass sheet to be bent on the crown areas of said convex shaping surface portions of the side members.

References Cited by the Examiner
UNITED STATES PATENTS

| | | | |
|---|---|---|---|
| 2,827,739 | 3/1958 | Atkeson | 65—107 X |
| 2,876,594 | 3/1959 | McRoberts et al. | 65—287 |
| 2,943,420 | 7/1960 | Kostic | 65—287 |
| 3,116,993 | 1/1964 | Richardson | 65—107 |

DONALL H. SYLVESTER, *Primary Examiner.*